Jan. 3, 1928.

C. R. SHORT

BEARING

Filed Aug. 3, 1920

1,655,167

Patented Jan. 3, 1928.

1,655,167

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

BEARING.

Application filed August 3, 1920. Serial No. 400,936.

This invention relates to bearings and particularly to soft metal wearing surfaces or liners for such bearings.

Among the objects of the invention is to prevent or greatly reduce the heating of such bearings and their consequent burning out.

Another object is to produce a bearing which, while retaining the desirable characteristics of the soft metal, will resist tendency to elongate under the pressures produced between the parts with which it is used.

Further objects and advantages of the invention will be apparent, reference being had to the accompanying drawings, wherein a preferred form of embodiment of the invention is clearly shown.

Figure 1:
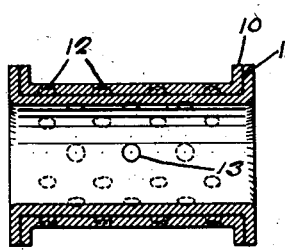
Fig. 1 illustrates an inside view of one-half of a bearing made in accordance with the present invention.
Figure 2:
Fig. 2 is a perspective view of one form of cooling plate.

In the drawings, the numeral 10 indicates a Babbitt metal bushing or bearing liner of ordinary shape having embedded therein a thin sheet of copper 11 which has the same general shape as that of the bushing. Such a copper element is shown clearly in Fig. 2.

It will be noted that the copper element is provided with a number of punched out portions 12 which extend a short distance from its surface toward the outer surface of the Babbitt metal. There is also provided one or more punched out portions 13 extending towards the inner face of the bearing. These punched out portions 12 and 13 have a combination of functions.

In the first place, in producing the bearing forming the subject matter of the present application, the mold for the bushing is prepared and the copper element placed therein, the punched out portions serving to position the copper at the proper distance between the walls of the mold.

In the second place, these punched out portions 12 and 13 serve as anchors for the sheet of copper in the mass of babbitt and thus tend to prevent the extension of the babbitt under the pressures applied thereto when in use.

Figure 3:
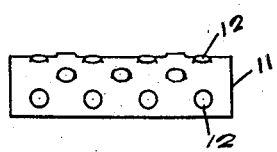
Fig. 3 is a side view of another form of cooling plate.

In Fig. 3 there is shown a modified form for the copper element, this form being intended to extend only to the ends of the liner or bushing and not out through any flanges with which the bushing may be provided.

Figure 4:
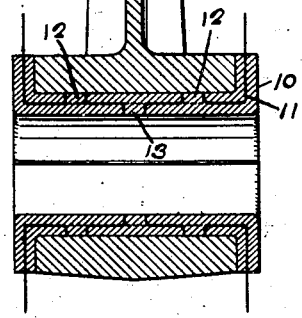
Fig. 4 is a partial vertical section of a piston rod utilizing the bearing, which latter is indicated as of a further modified form.

In Fig. 4 there is shown a further modified form of bushing. In this form the copper extends not only to the edges of the flanges but also to a short distance beyond these edges. This form is particularly advantageous in places where the bearing is to be subjected to extremely high pressures and consequently to greater friction and tendency to heat.

Other soft metals and alloys than Babbitt metal may be used for bearings of this kind, and liners for such bearings, but all have the characteristic of being very poor conductors of heat. Further, such metals usually have a relatively low melting point. As a direct result of these two characteristics, when the bearings are being used without efficient lubrication there is a great tendency for them to heat, owing to the friction produced by the moving parts. When such heating takes place it is usually greatest at the middle portion of the bearing, and, as a result of the poor heat conductivity of the bearing metal, this heat is not conducted away or distributed rapidly or uniformly and the melting point of the metal is soon reached. When the latter happens the usefulness of the bearing is obviously destroyed.

By producing a liner for bearings in accordance with the present invention, there is incorporated in the metal of the liner a metal of high heat conductivity, which latter metal rapidly conducts heat from the central portion to the outer portions of the bearing thus equalizing the temperature and, in cases where the edge of the bushing or bearing is exposed to air or oil, readily gives up this heat to such air or oil with the result that such a bearing will not heat up and consequently will not melt out.

It is of course obvious that for the Babbitt metal may be substituted other alloys which are ordinarily used for such purposes; and it is also obvious that for the copper there may be substituted another metal of relatively high heat conductivity and advantageous results obtained.

The bearings which form the subject matter of this application are particularly useful in piston rod or connecting rod bearings for internal-combustion engines, but it is obvious that the use is not limited to such apparatus as they undoubtedly will be found useful in other apparatus when the bearings are subjected to high pressures.

While the form of mechanism herein shown and described constitutes a preferred form of embodiment of the invention, it is to be understood that other forms might be adopted, all coming within the scope of the claims which follow.

What I claim is as follows:

1. A liner for bearings consisting of relatively soft metal having embedded therein metal of high heat conductivity, the latter metal extending beyond the soft metal at its ends.

2. A liner for bearings consisting of Babbitt metal having embedded therein metal of high heat conductivity, the latter metal extending beyond the Babbitt metal at its ends.

3. A liner for bearings consisting of Babbitt metal having embedded therein copper, the latter metal extending beyond the Babbitt metal at its ends.

4. A liner for bearings comprising a flanged bushing of relatively soft metal having a thin sheet of copper embedded therein, the copper extending in to the flanges and being provided with a plurality of projecting portions.

5. A liner for bearings comprising a flanged bushing of relatively soft metal having a thin sheet of copper embedded therein, the copper extending into and beyond the edges of the flanges and being provided with a plurality of projecting portions.

6. The combination of a soft metal bearing and a bearing back, an insert for the bearing comprising a thin sheet of good heat conducting material embedded in the bearing and having portions extending inwardly to points in close proximity to the bearing surface and other portions extending outwardly to the contacting surfaces of the bearing and back to dissipate heat which would otherwise be confined within the center of the bearing.

7. The combination of a soft metal bearing having a thin sheet of good heat conducting material embedded therein at substantially the middle portion thereof, said sheet being provided with discontinuous portions projecting out of the plane of the sheet to points on the outer surface of the bearing, said portions serving to anchor the sheet in the soft bearing metal and to dissipate the heat which would otherwise be confined within the body of the bearing.

8. In the combination as defined in claim 6, said bearing having end flanges and said insert being provided with portions extending into said flanges and exposed at the circumference thereof.

9. The combination of a soft metal bearing having end flanges, a reinforce of high heat conductive metal embedded in said bearing and having portions extending into said flanges and exposed at the circumference thereof for the purpose of conducting away heat from the interior of the bearing.

In testimony whereof I hereto affix my signature.

CHARLES R. SHORT.